(12) United States Patent
Humphrey et al.

(10) Patent No.: US 8,654,550 B2
(45) Date of Patent: Feb. 18, 2014

(54) CIRCULATING CURRENT DETECTION FOR REDUNDANT POWER SUPPLY

(75) Inventors: Daniel Humphrey, Houston, TX (US); Mohamed Amin Bemat, Cypress, TX (US); Mark Isagani Bello Rivera, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 387 days.

(21) Appl. No.: 12/817,716

(22) Filed: Jun. 17, 2010

(65) Prior Publication Data

US 2011/0310646 A1 Dec. 22, 2011

(51) Int. Cl.
*H02J 1/10* (2006.01)
*H02M 7/06* (2006.01)

(52) U.S. Cl.
USPC ............................................. 363/65; 363/126

(58) Field of Classification Search
USPC ............................................. 363/34, 65, 126
See application file for complete search history.

(56) References Cited

U.S. PATENT DOCUMENTS

| | | | |
|---|---|---|---|
| 5,894,413 A | | 4/1999 | Ferguson |
| 5,923,549 A * | | 7/1999 | Kobayashi et al. ............. 363/65 |
| 5,953,223 A * | | 9/1999 | Kato et al. ...................... 363/69 |
| 6,720,675 B2 * | | 4/2004 | Azuma et al. ................... 307/85 |
| 6,737,763 B2 * | | 5/2004 | Liu et al. .......................... 307/58 |
| 6,803,679 B1 * | | 10/2004 | Luo et al. ......................... 307/66 |
| 7,425,779 B2 * | | 9/2008 | Luo et al. ......................... 307/82 |
| 7,443,055 B2 | | 10/2008 | Pracht et al. |
| 7,739,525 B2 * | | 6/2010 | Bird .............................. 713/300 |
| 8,084,885 B1 * | | 12/2011 | Zansky et al. ................... 307/60 |
| 2003/0218894 A1 * | | 11/2003 | Utsunomiya ................... 363/65 |
| 2005/0114715 A1 * | | 5/2005 | Sone ............................. 713/300 |
| 2009/0219964 A1 * | | 9/2009 | Yossi et al. ................. 372/38.02 |
| 2011/0235379 A1 * | | 9/2011 | Siri ............................... 363/125 |

OTHER PUBLICATIONS

Zhang, Di, et al., "Internal Fault Detection and isolation for Paralleled Voltage Source Converters", IEEE, © 2009, pp. 833-839.

* cited by examiner

*Primary Examiner* — Adolf Berhane
*Assistant Examiner* — Emily P Pham

(57) ABSTRACT

A system and method for detecting a circulating current in a redundant AC-DC power supply is disclosed. In one embodiment, a redundant AC-DC power supply system can include a first AC-DC power converter that is configured to generate a first DC output. A second AC-DC power converter is configured to generate a second DC output. An output circuit is configured to provide an output voltage based on at least one of the first and second DC outputs. A controller is configured to control the first and second AC-DC power converters for providing at least one of the first and second DC outputs to the output circuit, the controller being configured to detect a circulating current condition in at least one idle converter of first and second AC-DC power converters.

18 Claims, 6 Drawing Sheets

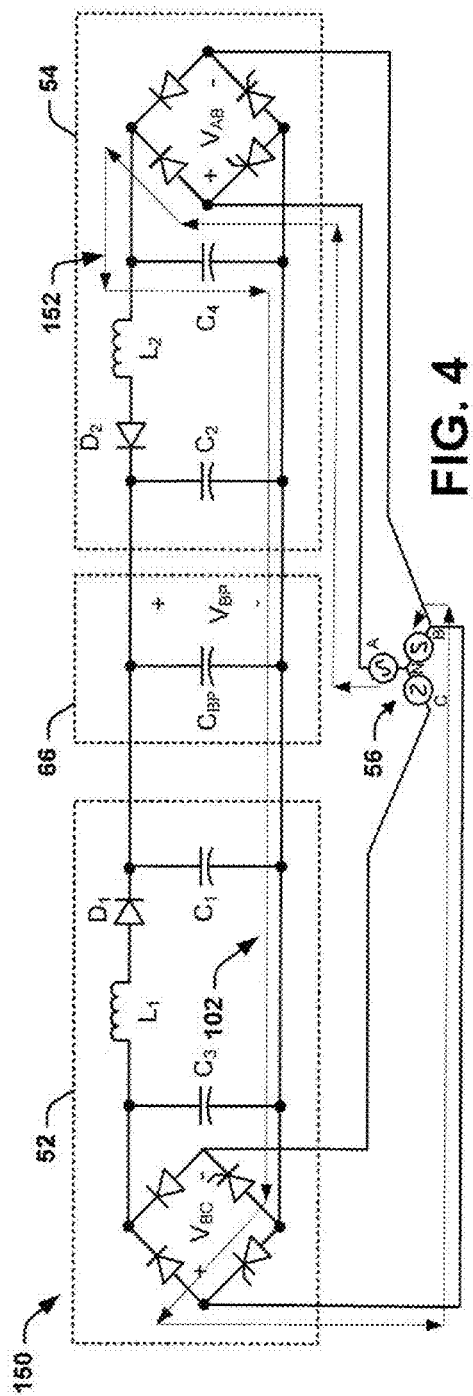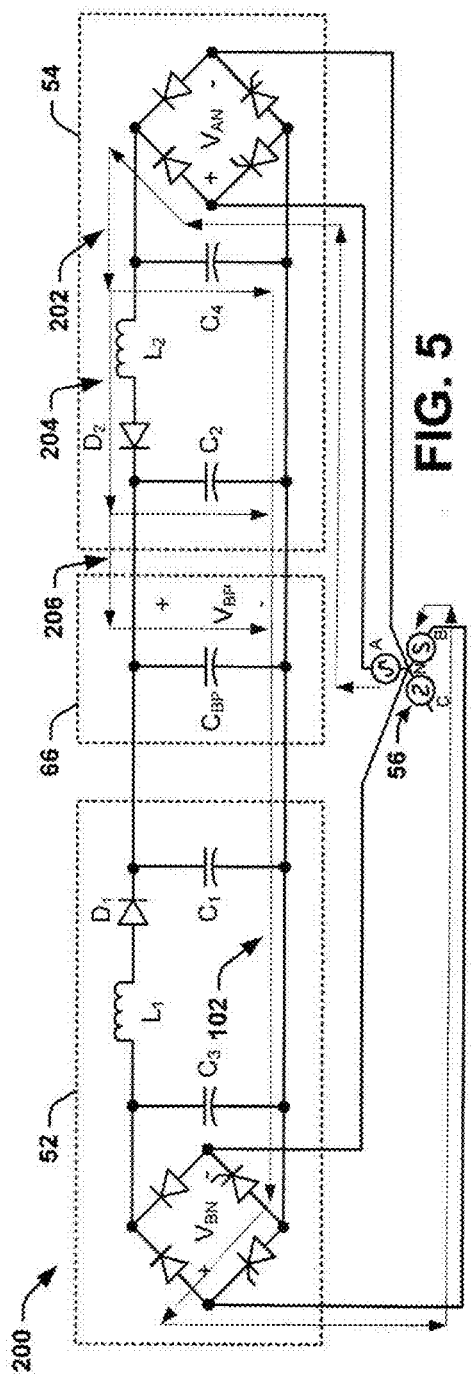

US 8,654,550 B2

CIRCULATING CURRENT DETECTION FOR REDUNDANT POWER SUPPLY

BACKGROUND

A power supply can be a device or system that supplies electrical energy to one or more load. There are many types of power supplies, which can be configured according to application requirements. One type of power supply is an AC-DC power supply that employs circuitry to convert an alternating current (AC) input signal to a direct current (DC) output. A power supply, however, can be exposed to varying input and load conditions, some of which may be potentially catastrophic conditions.

BRIEF DESCRIPTION OF THE DRAWINGS

FIG. 4 illustrates an example embodiment of a diagram depicting a first circulating current condition in a redundant power supply system.

FIG. 5 illustrates an example embodiment of a second circulating current condition in a redundant power supply system.

DETAILED DESCRIPTION

Figure 1:
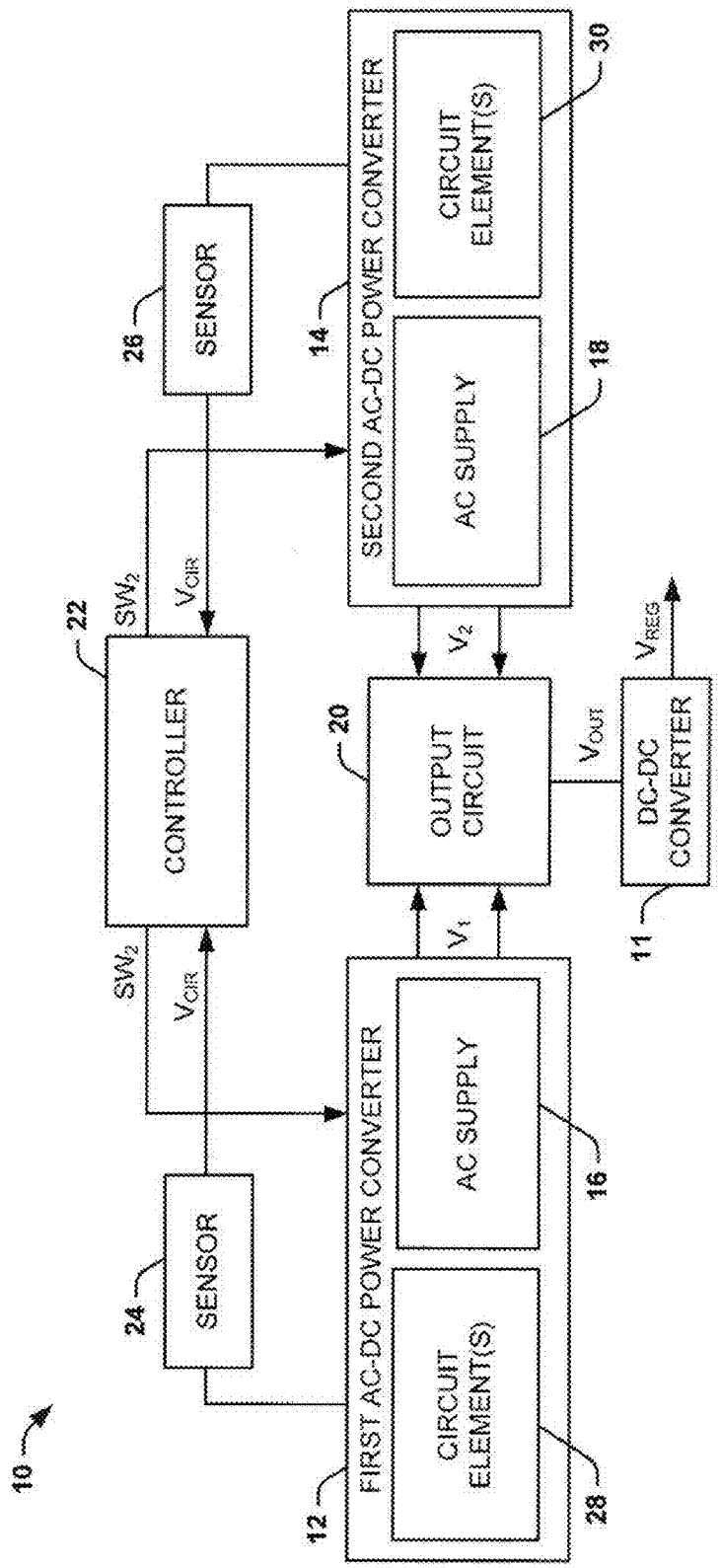
FIG. 1 illustrates an example embodiment of a redundant power supply system.

FIG. 1 illustrates an example embodiment of a redundant power supply system 10. The redundant power supply system 10 is configured to convert one or more alternating current (AC) voltage sources to a direct current (DC) voltage, which can be used in any of a variety of electronic applications. As an example, the redundant power supply system 10 can be implemented to generate the DC voltage for a backplane in a computer system, such as a server. For instance, the power supply system 10 can provide the DC voltage at an output, indicated at $V_{OUT}$, which can be the input voltage for a DC-DC converter 11. The DC-DC converter 11 can be configured to provide a regulated DC voltage ($V_{REG}$) for other circuitry for the computer system. Since the power supply system 10 is configured to provide redundancy at the AC-DC conversion stage, typical redundancy implemented DC-DC converters (such as the converter 11) can be omitted from the power supply system.

In the example of FIG. 1, the redundant power supply system 10 includes a first AC-DC power converter 12 and a second AC-DC power converter 14. The first AC-DC power converter 12 is configured to convert an AC voltage generated by an AC power supply 16 to a DC output voltage $V_1$. The second AC-DC power converter 14 is configured to convert an AC voltage generated by an AC power supply 18 to a DC output voltage $V_2$. In different embodiments, the AC power supply 16 can be the same or different from the AC power supply 18. For example, the AC power supply can be a three-phase power supply. The AC-DC power converters 12 and 14 can be connected to the power supply 18 in a manner that can vary according to application requirements and user preferences.

As an example, each of the first and second AC-DC power converters 12 and 14 can include a bridge rectifier circuit, which can include an arrangement of diodes, silicon controlled rectifiers (SCRs) or transistor devices. The AC-DC converters 12 and 14 can also include an inductor and switch arranged as a DC boost converter. In one example, the first and second AC-DC power converters 12 and 14 can each be configured as substantially identical converters with respect to each other.

The output voltages $V_1$ and $V_2$ from each of the respective AC-DC converters 12 and 14 can be connected to the output circuit 20, such as directly coupled or coupled via relays. The redundant power supply system 10 also includes an output circuit 20 which can, in turn, provide the output voltage $V_{OUT}$ based on the voltage or combination of voltages from the first and second AC-DC converters 12 and 14. While the example redundant power supply is shown and described herein as including two non-isolated AC-DC converters 12 and 14, those skilled in the art understand that redundancy can be provided from any number of non-isolated AC-DC converters. Depending on the connection of each of the AC-DC converters 12 and 14 to the respective AC power supplies 16 and 18, a common connection can exist that provides a potential path for circulating current.

As an example, the output circuit 20 can include a backplane capacitor that provides the output DC voltage $V_{OUT}$. The first and second AC-DC power converters 12 and 14 are considered non-isolated since they are each coupled to the output circuit 20, such as via hard-wiring or respective relays, and are not separated from each other by any isolation transformers. The first and second AC-DC power converters 12 and 14 thus can share common nodes through the output circuit 20 and/or through the AC supplies 16 and 18 depending on its configuration.

The redundant power supply system 10 further includes a controller 22 that is configured to control the redundant power supply system. The controller 22 can control the first and second AC-DC power converters 12 and 14, as well as any associated relays, to selectively provide one or both of the DC output voltages $V_1$ and $V_2$ to the output circuit 20. For example, the controller 22 can control the switching of the first and second AC-DC power converters 12 and 14 via respective switching signals $SW_1$ and $SW_2$ for generating the respective output voltages $V_1$ and $V_2$. In addition, the controller 22 can be configured to detect a circulating current associated with the redundant power supply system 10. In response to detecting the circulating current, the controller can implement appropriate corrective action (e.g., including controlling one or both of the AC-DC power converters 12 and 14).

In the example of FIG. 1, the redundant power supply system 10 includes one or more sensors 24 and 26 configured to sense an electrical signal indicative of a circulating current condition in the respective AC-DC power converters 12 and 14. For instance, the sensor 24 can be coupled to sense an electrical signal associated with one or more circuit elements 28 of the first AC-DC power converter 12. Similarly, the sensor 26 can be coupled to sense an electrical signal associated with one or more circuit elements 30 of the second AC-DC power converter 14. The circuit elements 28 and 30 are placed in a predetermined path through which circulating current is expected to flow. That is, during a circulating current condition, the circulating current will be forced through one or both of the circuit elements 28 and 30.

Those skilled in the art will appreciate that various types of devices or components can be utilized to implement sensors 24 and 26. For example, an analog-to-digital converter can be utilized to sense an electrical signal (e.g., voltage or current) across the circuit components 28 and 30 and, in turn, supply a sensor signal having a value that represents the sensed electrical signal to the controller 22. As another example, a light-emitting diode (LED) can be utilized in the circulating current path and an optocoupler can be configured to detect current flow through the LED. It will be understood that the detection of circulating current can be performed by the circuit elements 28 and 30 and the sensors 24 and 26 in the analog domain, the digital domain or involve a combination of analog and digital components.

By way of example, the circuit elements 28 and 30 can each include an arrangement of one or more circuit components that are coupled to and form part of the respective first and second AC-DC power converters 12 and 14. Alternatively or additionally, the circuit elements 28 and 30 can be implemented in the respective first and second AC-DC power converters 12 and 14 particularly for sensing purposes (e.g., current sense resistors or other circuitry, which can include passive and/or active circuit components). When additional circuitry is provided for sensing purposes, such circuitry can be controlled (e.g., by the controller 22), such as to selectively turn it on or off. The circuit elements 28 and 30 can also be configured to limit current flow through the circuitry, such as via resistance element to reduce the circulating currents that flow. One or more components (e.g., a diode) can also be implemented to ensure that current flows only in one direction through the circuit elements 28 and 30.

By way of further example, the controller 22 can be configured to detect circulating current when one or more of the first and second AC-DC power converters 12 and 14 is held idle. As used herein, the term "idle" is intended to mean that a given power converter does not supply power to the output circuit 20 even though it may be coupled to an AC supply; however, this may be because the converter is not connected to the output circuit or that it is otherwise inactive regardless of its connection to the output circuit. This can occur, for example, during a soft-start operation of one of the AC-DC power converters 12 or 14 while the other converter is held idle. Alternatively, this may occur during a hot-plug or hot-swap operation, such as when one of the power converters 12 or 14 is replaced and initially idle while the other converter operates normally to provide power to the output circuit 20.

Assuming that at least the one of the power converters (e.g., second AC-DC power converter 14) is idle, for instance, the controller 22 can monitor a signal $V_{CIR}$ provided by the sensor 26 of such idle converter to detect the occurrence of a circulating current condition. If both power converters 12 and 14 are idle, the controller 22 can detect a circulating current condition based on the signal from either or both of the sensors 24 and 26. In either case, the presence of the signal $V_{CIR}$ can thus indicate the occurrence of circulating current through each idle (e.g., inactive) converter.

As a further example, the circuit elements 28 and 30 of the first and second AC-DC power converters 12 and 14, respectively, can each include a capacitor arranged in parallel with the output circuit 20. Thus, a charge can build-up on each such parallel capacitors responsive to circulating current flow, which can be detected by respective sensors 24 and 26 and represented in the sensor signal, such as a voltage $V_{CIR}$, to indicate a circulating current condition.

As another example, the circuit elements 28 and 30 can each include an arrangement of components (e.g., a series switch, a diode, and a resistor) connected in a path of circulating current flow. The switch can be closed while an associated relay of the respective one of the first and second AC-DC power converters 12 and 14 is opened. Thus, circulating current in the redundant power supply system 10 can flow through the switch when closed as well as through the diode and resistor. The controller 22 can control the switch for detecting circulating current through an idle power converter. The resistor can be provided a sufficient resistance to limit the amount of current flow and the diode can be utilized to ensure that the circulating current flows in only one direction. Thus, a voltage across the resistor can be detected by the sensors 24 and 26 of the converter that is not being soft-started as to indicate a circulating current condition. Alternatively, or additionally, the diode can be implemented as an LED and the sensor can be implemented as an optocoupler configured to detect the circulating current condition in response to current flowing through the LED.

Any circulating current condition detected by the controller 22 can be at least a "zone 2" circulating current. As described herein, "zone 2 circulating current" is a circulating current in the redundant power supply system 10 in which at least one common line exists between the AC power supplies 16 and 18, which is supplied to the idle converter, such as during power-up or hot-swap. In addition, the circulating current can also be a "zone 1" circulating current. As described herein, "zone 1 circulating current" is a circulating current that results when a voltage potential for an idle one of the power converters exceeds the output voltage $V_{OUT}$, such as during start-up or hot-swap. The zone 1 circulating current can be due to connections between power converters 12 and 14 within the non-isolated redundant power supply system 10 with line-to-line peak voltages between the AC power supplies 16 and 18 being applied across a respective converter. As described herein, the controller 22 can be configured to detect at least the zone 2 circulating current, as well as the zone 1 current. Additionally, the controller 22 can be configured to differentiate between zones and determine which zone or zones the power supply system 10 is operating during a circulating current condition.

Figure 2:
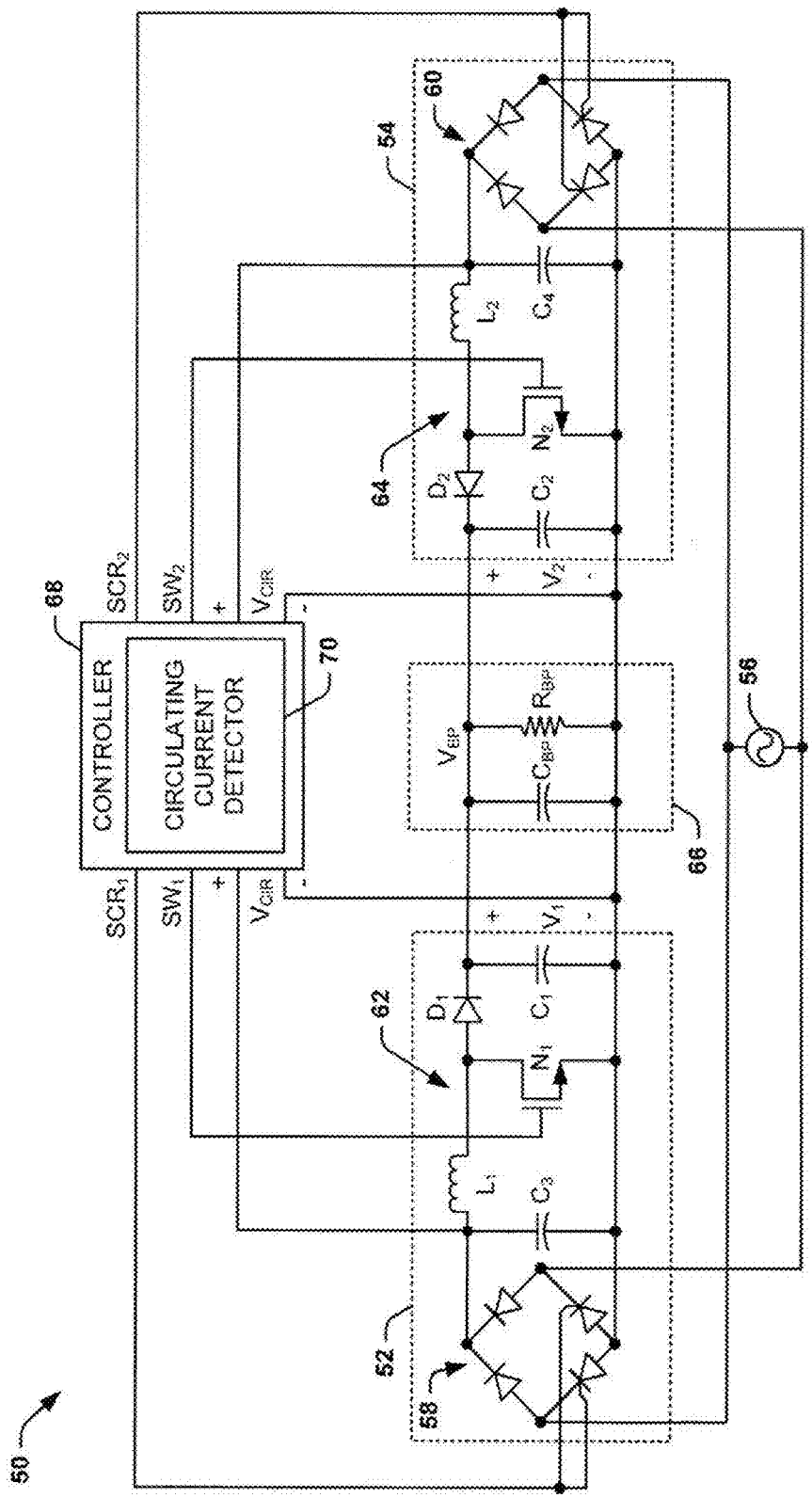
FIG. 2 illustrates another example embodiment of a redundant power supply system.

FIG. 2 illustrates another example of a non-isolated redundant power supply system 50. The redundant power supply system 50 is configured to provide an output voltage, demonstrated in the example of FIG. 2 as a voltage $V_{BP}$, which is across a resistor $R_{BP}$ and parallel capacitor $C_{BP}$. As an example, the voltage $V_{BP}$ can be representative of a DC voltage for the power backplane of a computer system (e.g., a server).

The redundant power supply system 50 includes a first AC-DC power converter 52 and a second AC-DC power converter 54. The first and second AC-DC power converters 52 and 54 can be configured substantially identical to each other. An AC power supply 56 generates an AC voltage to each of the first and second AC-DC power converters 52 and 54. For instance, the AC power supply provides the AC voltage (e.g., a line-to-neutral voltage) to a bridge rectifier 58 of the first AC-DC power converter 52 and to a bridge rectifier 60 of the second AC-DC power converter 54. In the example of FIG. 2, each of the rectifiers 58 and 60 includes two diodes and two SCRs configured in a full bridge arrangement. The SCRs can be controlled by signals SCR1 and SCR2, respectively. However, the bridge rectifiers 58 and 60 could instead include any arrangement of diodes, SCRs or any other type of switch device.

The first AC-DC power converter 52 can also include a DC boost converter 62 that includes an arrangement of an inductor $L_1$, a switch $N_1$ (demonstrated as an N-type field effect transistor (FET)), and a diode $D_1$ that generates a DC output voltage $V_1$ across an output capacitor $C_1$. Similarly, the second AC-DC power converter 54 includes a DC boost converter 64 that includes an arrangement of an inductor $L_2$, a switch $N_2$, and a diode $D_2$ that generates a DC output voltage $V_2$ across an output capacitor $C_2$.

Furthermore, each of the first and second AC-DC power converters 52 and 54 includes one or more circuit elements that can be utilized to sense the occurrence of a circulating current condition. For example, respective pre-charge capacitors $C_3$ and $C_4$ can be connected in parallel with the respective rectifiers 58 and 60 and provide a voltage that can, in certain circumstances, be indicative of a circulating current condition.

The redundant power supply system 50 also includes an output circuit 66 that includes the resistor $R_{BP}$ and output capacitor $C_{BP}$ arranged in parallel. The first and second AC-DC power converters 52 and 54 share common output nodes across the resistor $R_{BP}$ and the output capacitor $C_{BP}$, such that the output voltages $V_1$ and/or $V_2$ can be provided directly to the output circuit 66. The first and second AC-DC power converters 52 and 54 are thus non-isolated because no isolation transformers are used to electrically isolate them from each other.

The redundant power supply system 50 further includes a controller 68 that is configured to operate the first and second AC-DC power converters 52 and 54 to provide one or both of the output voltages $V_1$ and $V_2$ to the output circuit 66. For example, the controller 68 generates a switching signal $SW_1$ to control the switching of the switch $N_1$ in the first AC-DC power converter 52 and a switching signal $SW_2$ to control the switching of the switch $N_2$ in the second AC-DC power converter 54 to control the respective output voltages $V_1$ and $V_2$.

During initial startup (e.g., soft-start) or "hot-swap" of the first or second AC-DC converters 52 and 54 in the redundant power supply system 50, the controller 68 can be configured to control operation associated with an active one of the first and second AC-DC power converters 52 or 54. The controller 68 is also configured to control idle power converters as well as detection of circulating current.

As an example, during a soft-start operation of the first AC-DC power converter 52, the controller 68 can control the first AC-DC power converter 52 by activating the switch $N_1$ via the switching signal $SW_1$. Thus, the first AC-DC power converter 52 can operate to generate the DC output voltage $V_1$ by providing current through the inductor $L_1$ that charges the output capacitor $C_{BP}$. This current flow results in providing the voltage $V_{BP}$ across the resistor $R_{BP}$ commensurate with the voltage $V_1$. In addition, the controller 68 can set the second AC-DC power converter 54 to an idle mode, such as by turning off the rectification provided by the bridge rectifier 60 by ceasing current flow to the SCRs via the signal $SCR_2$.

In the example of FIG. 2, the controller 68 includes a circulating current sense component 70 that is configured to detect the occurrence of a circulating current in the redundant power supply system 50. During the soft-start operation of the first AC-DC power converter 52, the controller 68 can include a circulating current detector 70. The circulating current detector 70 is configured to monitor a voltage $V_{CIR}$ across the capacitor $C_4$ in the second AC-DC power converter 54. Because the second AC-DC power converter 54 is in an idle mode (e.g., not generating its DC voltage $V_2$) during the soft-start operation of the first AC-DC power converter 52, the magnitude of the voltage $V_{CIR}$ should be zero. However, the presence of a circulating current between the first and second AC-DC power converters 52 and 54 in the redundant power supply system 50 will result in a voltage across the capacitor $C_4$. For instance, the circulating current detector 70 can be configured to detect if a voltage exists across $C_4$, such as a magnitude of the voltage $V_{CIR}$ that is above a very small threshold, and thereby detect circulating current in the redundant power supply system 50. Alternatively or additionally, the circulating current detector 70 can be configured to detect a across $C_2$.

Figure 3:
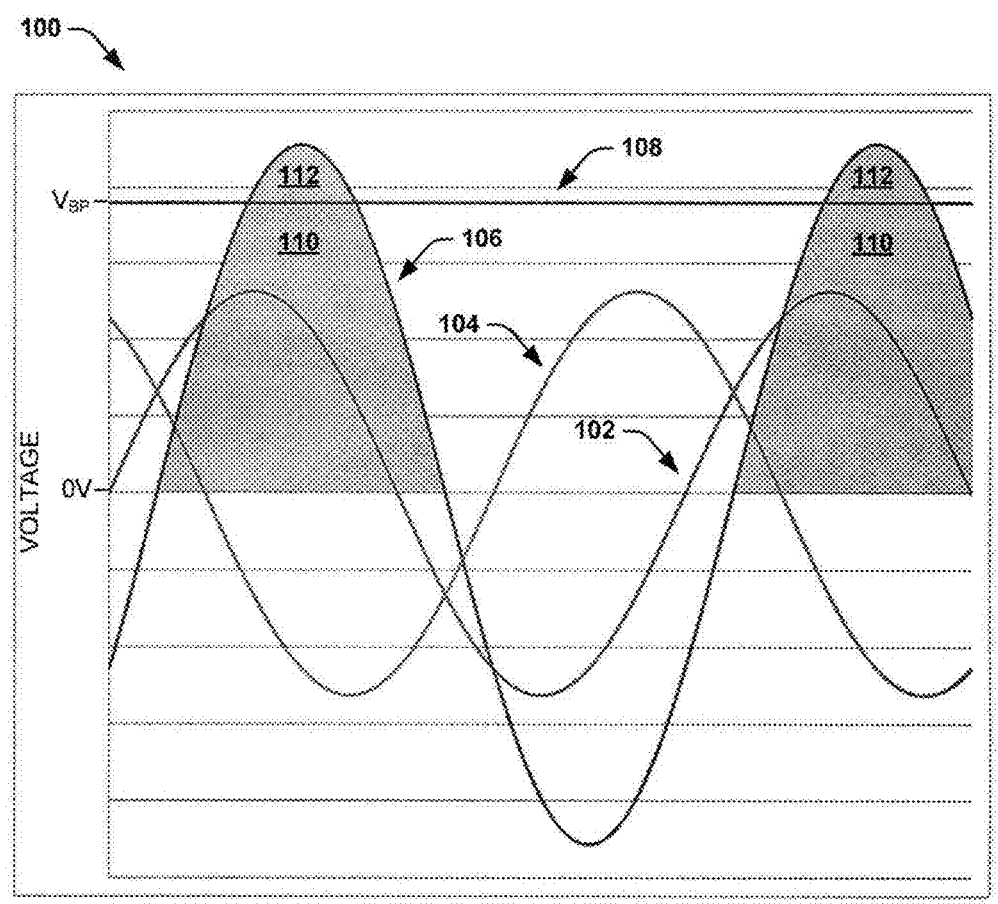
FIG. 3 illustrates an example embodiment of a graph depicting circulating current conditions.

FIG. 3 illustrates an example of a graph 100 depicting voltages for a power supply system that can occur during a circulating current condition. For instance, the graph 100 demonstrates a first AC voltage 102 that is indicative of a line-to-neutral voltage $V_{AN}$, such as can be supplied to a first AC-DC power converter and a second AC voltage 104 that is indicative of a line-to-neutral voltage $V_{BN}$, such as can be supplied to a second AC-DC power converter. The graph 100 also depicts a third AC voltage 106 that represents a line-to-line voltage $V_{AB}$, which can represent a peak line-to-line AC voltage that may exist across a power supply system having redundant, non-isolated power converters that are supplied with different AC line-to-neutral voltages and that share a common neutral.

As described herein, circulating current can exist as a zone 2 circulating current condition that is based on a non-zero line-to-line voltage potential of the AC voltage to each of the first and second AC-DC power converters 52 and 54. Zone 2 circulating current is represented in the graph 100 by the shaded region 110. The third AC voltage 106 also demonstrates that during a circulating current condition a line-to-line voltage 106 across the power supply can exceed the output voltage $V_{BP}$. This condition (when the peak line-to-line voltage 106 exceeds the output voltage $V_{BP}$) corresponds to a zone 1 circulating current, indicated at 112. Zone 1 and zone 2 circulating current conditions can result from current flow paths through the redundant power supply system 50.

FIG. 4 illustrates an example of a non-isolated redundant power supply system 150 demonstrating a zone 2 circulating current condition. The redundant power supply system 150 demonstrated in the example of FIG. 4 is substantially identical in configuration to the power supply system 50 in the example of FIG. 2. In the example of FIG. 4, the controller 68, the switches $N_1$ and $N_2$, and the resistor $R_{BP}$ have been omitted for the sake of simplicity. Like reference numbers are used in the example of FIG. 4 to identify components previously introduced in the example of FIG. 2. Accordingly, reference can be made to the example of FIG. 2 for additional description of its configuration.

In the example of FIG. 4, the AC power supply 56 is shown as a three phase power supply. The rectifier 58 of the AC-DC power converter 52 is connected to line-to-line voltage $V_{BC}$ and the rectifier 60 in the other AC-DC power converter 54 is connected to line-to-line voltage $V_{AB}$. Thus, each of the power converters includes a common connection via line B of the AC power supply 56.

As a result of the common connection, circulating current can flow through the power system 150 as demonstrated in FIG. 4. Assuming that at least the second AC-DC power converter 54 is idle (e.g., during a soft-start or hot-swap), circulating current can flow through the rectifier as indicated at 152. The current 152 from the rectifier 60 flows to other circuit components of the AC-DC converter 54 and to the other converter 52 for return via the common connection of line B of the AC power supply 56. For example, the current 152 can flow through capacitor C4 and in turn flows through a common connection to the rectifier 58 (e.g., through an SCR) and returns to the AC power supply 56 via the common connection provided by line B.

While the second AC-DC power converter 54 is in an idle mode, no current is expected to flow through the second AC-DC power converter under normal conditions. However, as demonstrated in the example of FIG. 4, circulating current 152 can flow from the AC power supply 56, through the bridge rectifier 60, and through the capacitor C4 before flowing to the first AC-DC power converter 52. Due to the circulating current flow 152, the capacitor C4 builds a charge corresponding to the voltage $V_{CIR}$. In the example of FIG. 4, the circulating current is a zone 2 circulating current due to the peak voltage across the power system 50 remaining less than or equal to $V_{BP}$. Accordingly, the circulating current condition can be sensed by one or more sense components to thereby detect the zone 2 circulating current 152.

FIG. 5 illustrates an example of a power supply system 200 demonstrating another circulating current condition that can exist when at least one of the power converters is idle. The redundant power supply system 200 in FIG. 5 is substantially identical in configuration to the power supply system 50 in the example of FIG. 2, although the controller 68, the switches $N_1$ and $N_2$, and the resistor $R_{BP}$ have been omitted for the sake of simplicity. Like reference numbers are used in the example of FIG. 5 to identify components previously introduced in the example of FIG. 2. Accordingly, reference can be made to the example of FIG. 2 for additional description of its configuration.

Similar to the example of FIG. 4, the AC power supply 56 of FIG. 5 is shown as a three phase power supply. However, the rectifier 58 of the AC-DC power converter 52 is connected to line-to-neutral voltage $V_{BN}$ and the rectifier 60 in the other AC-DC power converter 54 is connected to line-to-neutral voltage $V_{AN}$. Thus, each of the power converters includes a common connection via the neutral line of the AC power supply 56. Due to how the power supply 56 is connected to each of the redundant power converters 52 and 54, the power supply system 200 can exhibit both zone 1 and zone 2 circulating current conditions.

Assuming that at least the second AC-DC power converter 54 is idle (e.g., during a soft-start or hot-swap), circulating current can flow through the rectifier as indicated at 202. The current 202 from the rectifier 60 flows to other circuit components of the AC-DC converter 54 and to the other converter 52 and then returns via the common AC source connections of the power supply 56. For example, a portion of the current 202 can flow to charge capacitor $C_4$ and another portion of the current 204 can flow through $L_2$ or a bypass diode (not shown). A portion of the current 204 can flow to charge $C_2$ while another portion of this current, indicated at 206, flows to charge $C_{BP}$. Current can also charge capacitor C1 as it is connected in parallel with $C_{BP}$. The circulating current flows through a common connection to the rectifier 58 (e.g., through an SCR) and returns to the AC power supply 56.

The example of FIG. 5 demonstrates a configuration in which both a zone 2 current condition and a zone 1 current condition can exist. As described herein, any circulating current corresponds to a zone 2 circulating current condition and a zone 1 exists if the line-to-line voltage $V_{AB}$ of the system 200 exceeds $V_{BP}$, which can cause the voltage across $C_2$ and $C_4$ to also exceed $V_{BP}$. Thus, a sensed voltage across capacitor $C_4$, corresponding to a peak line-to-line supply voltage of the first and second AC-DC power converters 52 and 54, can be greater than the voltage $V_{BP}$. For example, upon substantial completion of the soft-start of the first AC-DC power converter 52, the voltage $V_{BP}$ is at an approximate maximum steady state voltage. Thus, if the peak magnitude of the line-to-line voltage $V_{AB}$ of the first and second AC-DC power converters 52 and 54 is greater than the peak magnitude of the voltage $V_{BP}$, the diode $D_2$ operates in a forward bias, thus conducting the circulating current 204 to the output capacitor $C_2$ of the second AC-DC power converter 54 and to the output capacitor $C_{BP}$ of the output circuit 66. Accordingly, as described herein, the zone 1 circulating current condition can be detected based on measuring the voltage across $C_2$ or across $C_4$ relative to the voltage $V_{BP}$ and determining that the measured voltage (e.g., $V_{C2}$ or across $V_{C4}$) exceeds $V_{BP}$.

Figure 6:
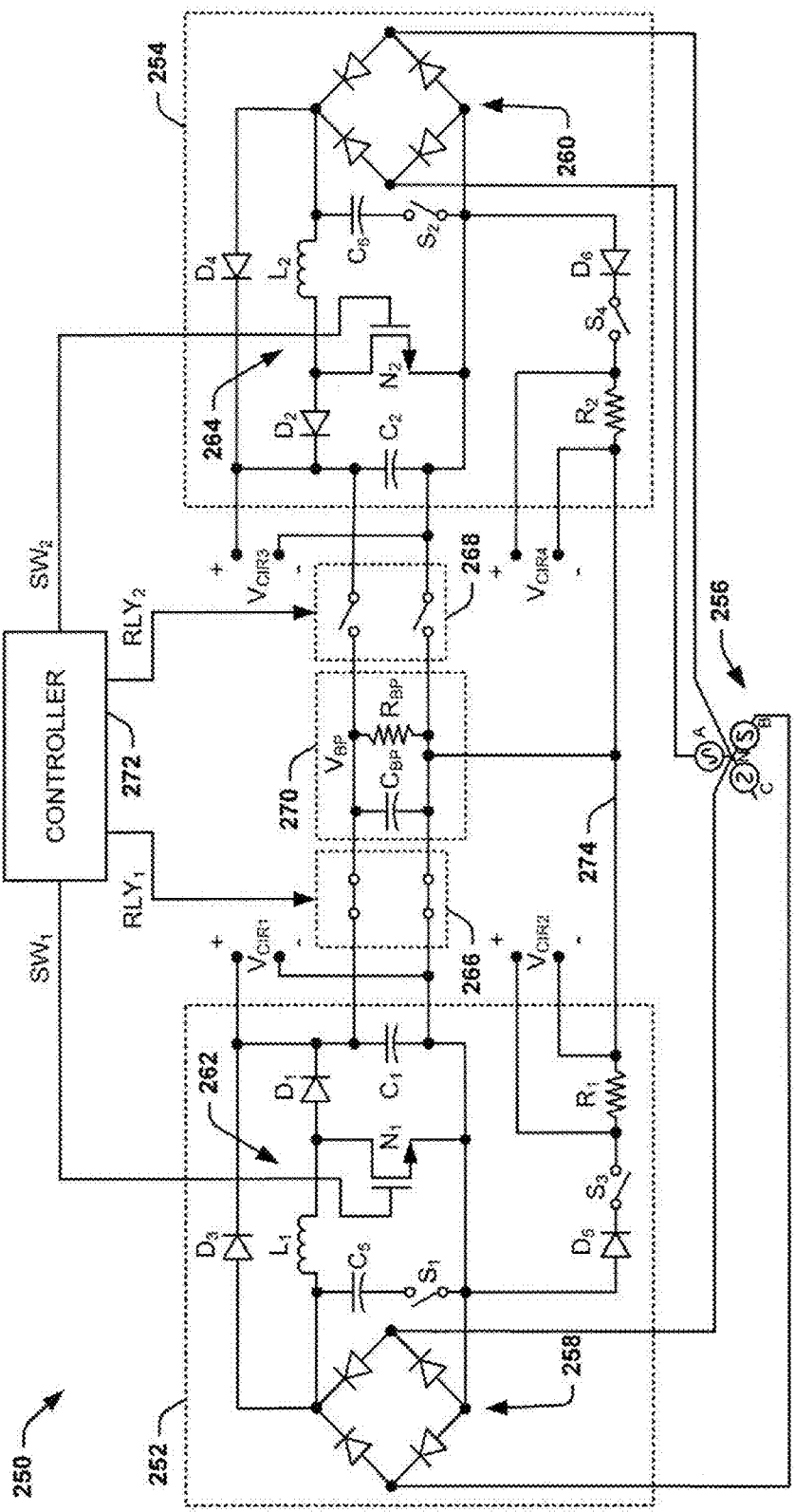
FIG. 6 illustrates yet another example embodiment of a redundant power supply system.

FIG. 6 illustrates another example embodiment of a non-isolated redundant power supply system. The redundant power supply system 250 is configured to provide an output voltage, demonstrated in the example of FIG. 6 as a voltage $V_{BP}$, which is across a resistor $R_{BP}$ and parallel capacitor $C_{BP}$. As an example, the voltage $V_{BP}$ can correspond to a DC power backplane of a computer system.

The redundant power supply system 250 includes a first AC-DC power converter 252 and a second AC-DC power converter 254. A three-phase AC power supply 256 supplies an AC voltage to each of the first and second AC-DC power converters 252 and 254. For instance, the AC power supply 256 provides the AC line-to-neutral voltage $V_{BN}$ to a bridge rectifier 258 of the first AC-DC power converter and a line-to-neutral voltage $V_{AN}$ to bridge rectifier 260 of the second AC-DC power converter 254. In the example of FIG. 6, each of the bridge rectifiers 258 and 260 include an arrangement of four diodes, but could instead include an arrangement of two diodes and two SCRs, for example.

The first and second AC-DC power converters 252 and 254 can also include DC boost converters 262 and 264, respectively, which are configured to generate DC output voltages respective capacitors $C_1$ and $C_2$. Each of the DC boost converters 262 and 264 can be arranged similar to the respective DC boost converters 62 and 64 in the example of FIG. 2.

In the example of FIG. 6, the first AC-DC power converter 252 also includes a series arrangement of a pre-charge capacitor $C_5$ and a switch $S_1$, which is connected in parallel with the bridge rectifier 258. The second AC-DC power converter 254 includes a series arrangement of a pre-charge capacitor $C_6$ and a switch $S_2$, which is connected in parallel with the bridge rectifier 260. Furthermore, the first and second AC-DC power converters 252 and 254 include respective diodes $D_3$ and $D_4$ that couple the bridge rectifiers 258 and 260 to their respective output capacitors $C_1$ and $C_2$.

The redundant power supply system 250 also includes a first relay 266, a second relay 268, and an output circuit 270. The first relay 266 selectively interconnects the first AC-DC power converter 252 and the output circuit 270 and the second relay 268 selectively interconnects the second AC-DC power converter 254 and the output circuit 270. In the example of FIG. 6, the first and second relays 266 and 268 each includes a pair of switches that can be controlled to selectively couple and decouple the first and second AC-DC power converters 252 and 254, and thus their respective output voltages, relative to the output circuit 270. The output circuit 270 includes the resistor $R_{BP}$ and output capacitor $C_{BP}$ arranged in parallel to supply the output voltage $V_{BP}$.

The first and second AC-DC power converters 252 and 254 are non-isolated because no isolation transformers are used to electrically isolate them from each other. The first and second AC-DC power converters 252 and 254 further share common output nodes across the resistor $R_{BP}$ and the output capacitor $C_{BP}$ when the switches of both of the relays 266 and 268 are closed.

A controller 272 can be configured to operate the first and second AC-DC power converters 252 and 254 and the first and second relays 266 and 268 to selectively provide one or both of the output voltages $V_1$ and $V_2$ to the output circuit 270. As an example, the controller 272 can be configured to operate substantially similar to the controller 68 in the example of FIG. 2. For instance, the controller 272 can generate switching signals $SW_1$ to control the switching of the switch $N_1$ in the first AC-DC power converter 252 and a switching signal $SW_2$ to control the switching of the switch $N_2$ in the second AC-DC power converter 254 to control the respective output voltages $V_1$ and $V_2$. The controller 272 can also generate signals $RLY_1$ and $RLY_2$ to open and close the respective first and second relays 266 and 268 to thereby couple and decouple the first and second AC-DC power converters 252 and 254 to the output circuit 270, respectively.

The first AC-DC power converter 252 includes one or more circulating current sense elements configured to sense circulating current. Each circulating current sense element can be one or more components arranged in a path of circulating current. For example, the controller 272 can selectively turn on or off the current sense element. The current sense element can also be configured to limit current flow through the circuitry, such as via resistance element to reduce the circulating currents that flow. One or more components of the circulating current sense element can also be implemented to ensure that current flows only in one direction.

In the example of FIG. 6, the circulating current sense element associated with the first power converter 252 includes as a series arrangement of a diode $D_5$, a switch $S_3$ (e.g., a transistor, such as a FET) and a resistor $R_1$ that interconnect the output capacitor $C_1$ and the output circuit 270, and are thus arranged in parallel with a path of the first relay 266. The second AC-DC power converter 254 also includes a circulating current sense element, demonstrated as including a series arrangement of a diode $D_6$, a switch $S_4$, and a resistor $R_2$ that interconnect the output capacitor $C_2$ and the output circuit 270, and are thus arranged in parallel with a path of the second relay 268.

The controller 272 can be configured to control one of the first and second AC-DC power converters 252 and 254 in an idle state, such as during normal operation or soft-start of the other converter. For example, during a soft-start operation of the first AC-DC power converter 252, the controller can close the first relay 266 via the signal $RLY_1$, close the switch $S_1$, open the switch $S_3$, and activate the switch $N_1$ via the switching signal $SW_1$. Thus, the first AC-DC power converter 252 can convert the AC supply voltage from the supply 256 to a corresponding DC output voltage $V_1$ that is provided to the output circuit 270 (e.g., the parallel capacitor $C_{BP}$ and resistor $R_{BP}$). Additionally, during such soft-start, the controller 272 can set the second AC-DC power converter 254 to an idle mode, such as by opening the second relay 268 and not providing the switching signal $SW_2$ to activate $N_2$. The controller 272 can also activate the circulating current sense circuitry associated with the second power converter 254, such as by closing the switch $S_4$, which provides a possible current path through the diode $D_6$ and the resistor $R_2$.

In the example of FIG. 6, the controller 272 can detect the occurrence of a circulating current in the redundant power supply system 250. As an example, during the soft-start operation of the first AC-DC power converter 252, the controller can monitor a voltage $V_{CIR4}$ across the resistor $R_2$ in the second AC-DC power converter 254. Because the second AC-DC power converter 254 is in an idle mode during the soft-start operation of the first AC-DC power converter 252, and thus the relay 268 is open, the only possible current path for circulating current is through the diode $D_4$ and through the series connection of the diode $D_6$, the closed switch $S_4$, and the resistor $R_2$. Therefore, the magnitude of the voltage $V_{CIR4}$ should be at or very near zero in the absence of circulating current. However, a circulating current between the first and second AC-DC power converters 252 and 254 in the redundant power supply system 250 can generate a measurable voltage $V_{CIR4}$ across the resistor $R_2$. Therefore, a measurable magnitude of the voltage $V_{CIR4}$, such as above a very small threshold, can be indicative of at least a zone 2 circulating current in the redundant power supply system 250.

If circulating current is detected, it can be desirable to ascertain whether the circulating current corresponds to a usually manageable zone 2 or potentially catastrophic zone 1 condition. Accordingly, upon detecting the presence of circulating current in the redundant power supply system 250, which as explained herein is at least a zone 2 circulating current, the controller 272 can also discern whether the circulating current corresponds to a zone 1.

As one example, the controller 272 can be configured to determine the occurrence of a circulating current condition by detecting current flow through the resistor $R_2$. If current flows through the resistor $R_2$, it can be concluded that at least a zone 2 circulating current condition exists. The controller can also be configured to determine a magnitude of the circulating current based on the voltage $V_{CIR4}$ and the resistance of the resistor $R_2$. The controller 272 can further be configured to ascertain whether the current corresponds to a zone 1 circulating current condition based on the measured circulating current relative to the input voltages measured by the controller 272.

As another example, the controller 272 can be configured to monitor a voltage $V_{CIR3}$ across the output capacitor $C_2$ of the second AC-DC power converter 254. For instance, as described above regarding the example of FIG. 5, the zone 1 circulating current can flow through the output capacitor $C_2$. Thus, to detect whether a zone 1 circulating current exists during soft-start of the first converter 252, the controller can compare the voltage $V_{CIR3}$ relative to the backplane DC voltage $V_{BP}$ provided by the output circuit 270. Thus, if the voltage $V_{CIR3}$ exceeds the magnitude of the steady state DC voltage $V_{BP}$, then the controller 272 can detect that zone 1 current exists in the power supply system 250.

The description of the example of FIG. 6 is with reference to detecting a circulating current based on measuring one or both of the voltages $V_{CIR3}$ and $V_{CIR4}$ in the second AC-DC power converter 254, which is idle while the first AC-DC power converter 252 is presumed to be active. However, it is to be understood that, in the example of FIG. 6, a circulating current can also be detected (e.g., by the controller 272) while the first AC-DC power converter 252 is idle, such as based on measuring one or both of the voltages $V_{CIR2}$ and $V_{CIR1}$.

It is also to be understood that the redundant power supply system 250 is not intended to be limited to the example configuration of FIG. 6. For instance, specifications of the redundant power supply system 250 may not require detection of a zone 1 circulating current, but only at least a zone 2 circulating current. As an alternative example, the series connection of the diode $D_6$, the switch $S_4$, and the resistor $R_2$ (or some other configuration of circulating current sense element) could instead be coupled between the cathodes of the diodes $D_2$ and $D_4$ and node 274, such that the voltage $V_{CIR4}$ across the resistor $R_2$ can provide an indicator that at least the zone 2 circulating current exists in the second AC-DC converter 254. Additionally, the voltage $V_{CIR4}$ across the resistor $R_2$ can be utilized to determine if the circulating current is a zone 1 circulating current, such as described herein. Similarly, series connection of the diode $D_5$, the switch $S_3$, and the resistor $R_1$ could instead be coupled between the node 274 and the cathodes of the diodes $D_3$ and $D_1$, such that the voltage $V_{CIR2}$ can provide an indicator that at least the zone 2 circulating current exists in the first AC-DC power converter 252. Other additional circulating current sensing devices and/or methodologies can be implemented in the redundant power supply system 250 in the example of FIG. 6.

Figure 7:
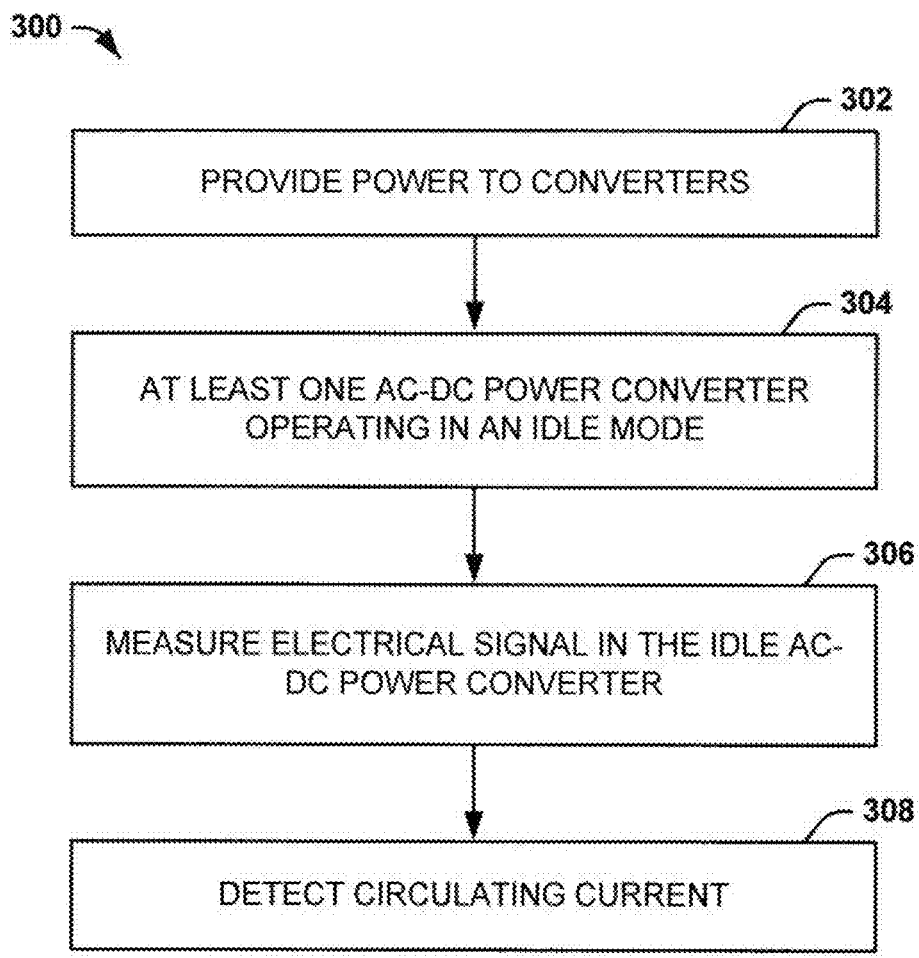
FIG. 7 illustrates an example embodiment of a method for detecting circulating current in a redundant AC-DC power supply system.

In view of the foregoing structural and functional features described above, a methodology will be better appreciated with reference to FIG. 7. While, for purposes of simplicity of explanation, the methodology of FIG. 7 is shown and described as executing serially, it is to be understood and appreciated that the methodology is not limited by the illustrated order as, in other embodiments, some parts of the method could occur in different orders and/or concurrently from that shown and described herein.

FIG. 7 illustrates an example embodiment of a method 300 for detecting a circulating current in a non-isolated redundant AC-DC power supply system. At 302, power is provided to power converters of the power supply system, such as from an AC power supply.

At 304, one or more AC-DC power converters are, operated in an idle mode. As an example, a first AC-DC power converter (e.g., the AC-DC power converter 12 of FIG. 1, the AC-DC power converter 52 of FIG. 2 or the AC-DC power converter 252 of FIG. 6) can be operated to provide its output voltage to an output circuit, while a second AC-DC power converter (e.g., the AC-DC power converter 14 of FIG. 1, the AC-DC power converter 54 of FIG. 2 or the AC-DC power converter 254 of FIG. 6) does not provide its DC output voltage to an output circuit. Thus, in this example, the second AC-DC converter would be operating in an idle mode. The output circuit can be implemented as shown and described herein (the output circuit 20 of FIG. 1, the output circuit 66 of FIG. 2 or the output circuit 270 of FIG. 6).

At 306, an electrical signal is sensed in the at least one idle AC-DC power converter. The electrical signal being sensed in the idle power converter can be a circuit element that is arranged in a path of potential circulating current. The circuit element(s) across which the signal is sensed can be implemented in variety of different ways, such as shown and described herein (e.g., the circuit elements 30 of FIG. 1, the capacitor $C_2$ of FIG. 2 or the Resistor $R_2$ and/or capacitor $C_2$ of FIG. 6).

At 308, circulating current (if any) is detected. For example, the circulating current can be sensed by sensors or detectors implemented within or external to the power supply system, such as shown and described herein (e.g., the circuit elements 30 of FIG. 1, FIG. 2 and FIGS. 4-6 ). Additionally, a controller (e.g., the controller 22 of FIG. 1, the controller 68 of FIG. 2, the controller 272 of FIG. 6) can be configured to determine whether the circulating current condition corresponds to only zone 2 or if it involves a zone 1 circulating current condition, as described herein (see, e.g., FIG. 3 and FIG. 5). Based on the detected circulating current condition, the controller can further take appropriate protective action.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A redundant AC-DC power supply system comprising:
a first AC-DC power converter that is configured to generate a first DC output;
a second AC-DC power converter that is configured to generate a second DC output;
an output circuit having first and second inputs, said output circuit being configured to provide an output voltage based on power received at said first and second inputs; and
a controller configured to control:
whether the first AC-DC power converter is active in that it provides the first DC output to the first input of the output circuit or is idle in that it does not provide the first DC output to the first input of the output circuit, and
whether the second AC-DC power converter is active in that it provides the second DC output to the second input of the output circuit or is idle in that it does not provide the second DC output to the second input of the output circuit,
the controller being configured to detect a circulating current condition in at least one idle converter of first and second AC-DC power converters.

2. The system of claim 1, further comprising at least one sensor configured to sense an electrical signal in the at least one idle converter and provide a sensor signal indicative of the circulating current condition based on the electrical signal that is sensed, the controller determining the occurrence of the circulating current condition based on the sensor signal.

3. The system of claim 2, wherein the at least one idle converter comprises the second AC-DC power converter, the system further comprising at least one circuit element in the second AC-DC power converter that is arranged in a path of the circulating current, the at least one sensor measuring the electrical signal of the at least one circuit element to provide the sensor signal.

4. The system of claim 2, wherein the at least one idle converter comprises the second AC-DC power converter,
wherein the output circuit comprises an output capacitor, and
wherein the at least one sensor is further configured to measure a voltage across an input capacitor of the second AC-DC power converter, the controller determining the circulating current condition based on the voltage across the input capacitor.

5. The system of claim 2, further comprising:
circulating current sense circuitry residing along an expected path of circulating current, the controller being configured to operate the circulating current sense circuitry to conduct current flow therethrough and to detect the electrical signal indicative of the circulating current condition.

6. The system of claim 5, wherein the at least one idle converter comprises the second AC-DC power converter, the system further comprising:
a first relay that is operated by the controller to selectively couple and decouple the first AC-DC power converter to and from the output circuit, respectively; and
a second relay that is operated by the controller to selectively couple and decouple the second AC-DC power converter to and from the output circuit, respectively;
wherein the circulating current sense circuitry comprises a switch device, a diode and a resistor arranged in series with each other and connected across the second relay,
the controller being configured to operate at least the second relay to decouple the second AC-DC power converter from the output circuit such that it operates in an idle mode, the controller being configured to operate the switch device to provide a current path through the circulating current sense circuitry to detect the circulating current condition based on detecting current through at least one of the resistor and the diode.

7. The system of claim 6, wherein, in response to detecting the circulating current condition, the controller is further configured to measure a voltage across an output capacitor of the second AC-DC power converter and compare the voltage across the output capacitor relative to the output voltage provided by the output circuit to ascertain whether the circulating current condition corresponds to a zone 1 circulating current condition or a zone 2 circulating current condition.

8. The system of claim 6, wherein the second AC-DC power converter includes an output capacitor coupled between the second relay and a rectifier of the second AC-DC power converter for providing the second DC output as a second DC voltage, the system further comprising a sensor coupled to measure the second DC voltage to provide an indication of the second DC voltage to the controller, the controller being configured to detect the circulating current through the second AC-DC power converter based on the indication of the second DC voltage.

9. The system of claim 1, wherein the controller is configured to determine whether the circulating current condition is a zone 1 circulating current condition or a zone 2 circulating current condition based on comparing the output voltage of the output circuit with a voltage associated with the at least one idle converter.

10. A method for detecting circulating current in a redundant AC-DC power supply system, the method comprising:
providing power to first and second non-isolated AC-DC power converters of the AC-DC power supply system, the first and second non-isolated AC-DC power converters being coupled to provide respective first and second DC voltages to an output circuit configured to provide an output voltage based on power received from the first and second non-isolated AC-DC power converters;
controlling said first and second non-isolated AC-DC power converters to determine:
whether the first AC-DC power converter is active in that it provides the first DC output to the first input of the output circuit or is idle in that it does not provide the first DC output to the first input of the output circuit, and
whether the second AC-DC power converter is active in that it provides the second DC output to the second input of the output circuit or is idle in that it does not provide the second DC output to the second input of the output circuit,
sensing an electrical signal in an idle one of the first and second non-isolated AC-DC power converters; and
detecting a circulating current condition in the idle power converter based on the sensed electrical signal.

11. The method of claim 10, wherein sensing the voltage across the electrical signal comprises measuring a voltage across an input capacitor arranged in parallel with a rectifier circuit of the idle power converter.

12. The method of claim 10, further comprising:
operating circulating current sense circuitry to conduct current flow through the circulating current sense circuitry, the circulating current sense circuitry being arranged along a predetermined path of the circulating current; and
the detecting including detecting the electrical signal in response to the circulating current flowing through the circulating current sense circuitry.

13. The method of claim 10, further comprising:
operating a first relay to couple the first AC-DC power converter to supply the first DC voltage to the output circuit, such that the first AC-DC power converter can supply the first DC voltage to the output circuit;
operating a second relay to decouple the second AC-DC power converter and the output circuit such that the second AC-DC power converter operates in the idle mode; and
activating a switch device, which is part of the circulating current sense circuitry of the second AC-DC power converter and is connected across the second relay, to provide a current path through the circulating current sense circuitry.

14. The method of claim 13, wherein the circulating current sense circuitry further includes a diode and a resistor connected in series with the switch device; and
the sensing further including sensing the electrical signal in response to the circulating current flowing through at least one of the resistor and the diode.

15. The method of claim 14, further comprising measuring a voltage across an output capacitor of the second AC-DC power converter relative to an output voltage of the output circuit to determine a relative level of the circulating current.

16. The method of claim 10 further comprising determining whether the circulating current is a zone 1 circulating current or is a zone 2 circulating current.

17. The method of claim 10 wherein the determining whether the circulating current is a zone 1 circulating current or is a zone 2 circulating current includes comparing a voltage associated with the idle power converter with an output voltage of the output circuit.

18. The method of claim 16 further comprising, in response to a determination that said circulating current is a zone 1 circulating current, operating a switch to block the circulating current.

* * * * *

UNITED STATES PATENT AND TRADEMARK OFFICE
CERTIFICATE OF CORRECTION

| | | |
|---|---|---|
| PATENT NO. | : 8,654,550 B2 | Page 1 of 1 |
| APPLICATION NO. | : 12/817716 | |
| DATED | : February 18, 2014 | |
| INVENTOR(S) | : Daniel Humphrey et al. | |

It is certified that error appears in the above-identified patent and that said Letters Patent is hereby corrected as shown below:

In the Specification

Column 6, line 6, delete "across" and insert -- voltage across --, therefor.

Column 11, line 17, delete "are," and insert -- are --, therefor.

Signed and Sealed this
Sixteenth Day of September, 2014

Michelle K. Lee
*Deputy Director of the United States Patent and Trademark Office*